(12) United States Patent
Fukasaku et al.

(10) Patent No.: US 8,787,764 B2
(45) Date of Patent: Jul. 22, 2014

(54) PHOTOELECTRIC COMPOSITE WIRING COMPONENT AND ELECTRONIC APPARATUS USING THE PHOTOELECTRIC COMPOSITE WIRING COMPONENT

(75) Inventors: Izumi Fukasaku, Tsurugajima (JP); Koki Hirano, Hitachinaka (JP); Masahiko Kobayashi, Hitachi (JP); Akihiro Hiruta, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 1166 days.

(21) Appl. No.: 12/312,182

(22) PCT Filed: Sep. 20, 2007

(86) PCT No.: PCT/JP2007/068282
§ 371 (c)(1), (2), (4) Date: Apr. 29, 2009

(87) PCT Pub. No.: WO2008/053645
PCT Pub. Date: May 8, 2008

(65) Prior Publication Data
US 2010/0067915 A1   Mar. 18, 2010

(30) Foreign Application Priority Data
Oct. 31, 2006 (JP) .................. 2006-295701

(51) Int. Cl.
*H04B 10/00* (2013.01)

(52) U.S. Cl.
USPC ......................................... 398/116; 398/115

(58) Field of Classification Search
CPC ........ H04B 10/00; H04B 10/12; H04B 10/14; H04B 10/152; H04B 10/25; H04B 13/00; G02B 6/4214; G02B 6/43; G02B 6/0005; G02B 6/10; G02B 6/102; G02B 6/12; G02B 6/4401; G02B 6/4402

USPC .......... 398/115, 116, 117, 141, 140, 142, 12, 398/19, 33
See application file for complete search history.

(56) References Cited

U.S. PATENT DOCUMENTS

2005/0105913 A1* 5/2005 Ozeki et al. .................... 398/140
2005/0190545 A1* 9/2005 Reznik et al. .................. 361/803

(Continued)

FOREIGN PATENT DOCUMENTS

JP  9-96746 A   4/1997
JP  2842388 B2  1/1999

(Continued)

OTHER PUBLICATIONS

ADN2890, 3.3V 2.7 Gb/s Limiting Amplifier, Analog Devices, www.analog.com, 2004, pp. 1-12.*

(Continued)

*Primary Examiner* — M. R. Sedighian
(74) *Attorney, Agent, or Firm* — McGinn IP Law Group, PLLC (57) ABSTRACT

To provide a photoelectric composite wiring component combining both characteristics of low power consumption of transmission over electrical wiring and large transmission capacity of optical transmission over optical wiring, and exhibiting a high power efficiency for the transmission capacity. A mechanism for switching between transmission of a transmission signal over an electrical transmission path and that over an optical transmission path depending on the modulation rate or the transmission rate of the transmission signal is provided. When the modulation rate or the transmission rate of the transmission signal is low, power supply to an optical transmitting/receiving section is stopped and the signal is transmitted over the electrical transmission path, thus achieving low power consumption. When the modulation rate or the transmission rate of the transmission signal is high, the signal is transmitted over the optical transmission path, thus achieving a large transmission capacity.

13 Claims, 4 Drawing Sheets

(56) References Cited

U.S. PATENT DOCUMENTS

2005/0281555 A1   12/2005   Tomita et al.
2006/0067608 A1   3/2006   Kobayashi et al.
2008/0075465 A1*   3/2008   Shao et al. .................... 398/115

FOREIGN PATENT DOCUMENTS

JP       11-352362 A    12/1999
JP       2006-33804 (A)    2/2006
JP       2006-91241 A    4/2006

OTHER PUBLICATIONS

Notification of Reason(s) for Refusal dated Aug. 9, 2011, with English translation.
Form PCT/IB/308.
Form PCT/IB/338.
Form PCT/IB/373.
English-language translation of Form PCT/ISA/237.

* cited by examiner

PHOTOELECTRIC COMPOSITE WIRING COMPONENT AND ELECTRONIC APPARATUS USING THE PHOTOELECTRIC COMPOSITE WIRING COMPONENT

FIELD OF THE INVENTION

The present invention relates to a photoelectric composite wiring component, and more particularly, to a photoelectric composite wiring component having a transmission path switching mechanism for switching a transmission path for a transmission signal to an electrical transmission system or an optical transmission system in accordance with a transmission rate of the transmission signal. Further, the present invention relates to an electronic apparatus using the photoelectric composite wiring component.

This application is based on Japanese Patent Application No. 2006-295701 and entire contents of which is incorporated herein by reference.

RELATED ART

Development of the electronic apparatus for conducting a high-resolution moving image transmission is rapidly progressed, so that it is strongly demanded to increase a transmission capacity in appliance wiring. In addition, in accordance with downsizing of the electronic apparatus, reduction in width of an electrical wiring component becomes a technical problem. Therefore, it is studied to reduce the width of the electrical wiring component by decreasing the number of the electrical wirings by increasing the transmission capacity per one electrical wiring. However, since there is a limit for enhancement of the transmission rate in the electrical wiring, a photoelectric composite wiring component using an optical communication technique is researched as a technique for realizing a large capacity and high speed transmission.

Figure 8:
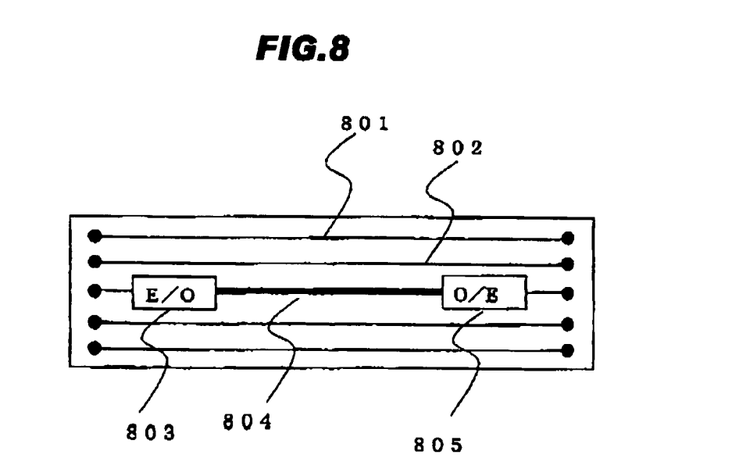
FIG. 8 is a schematic diagram showing a conventional photoelectric composite wiring component.

FIG. 8 shows an example of conventional photoelectric composite wiring component. Electrical wirings are used as a power supply line 801 for a power supply for an electronic apparatus with and a signal line 802 of a low transmission rate (100 Mbit/sec or less) for acoustic signals, the electrical wirings are used. On the other hand, as to signals that are hard to be transmitted as electrical signals, for example, the moving image signals that require the high transmission rate (for example, 1.25 Gbit/sec or more for 8B10B code), an optical transmission system comprising an E/O converter 803 for conducting electric/optical signal conversion in a light emitting element provided at one end of an optical wiring, an optical wiring 804 for transmitting optical signals emitted from the light emitting element by optical transmission, and an O/E converter 805 for conducting optical/electric conversion in a light receiving element provided at another end of the optical wiring.

Herein, distinction in use of the electrical wiring or the optical wiring depends on a maximum value of the transmission rate of the signals to be transmitted over the signal line. Following patent documents show conventional arts.
Patent document 1: Japanese Patent Laid-Open No. 9-96746
Patent document 2: Japanese Patent No. 2842388
Patent document 3: Japanese Patent Laid-Open No. 11-352362
Patent document 4: Japanese Patent Laid-Open No. 2006-091241

However, the large transmission capacity realized by the high modulation rate or the high transmission rate is not always required in the signal line requiring a high maximum transmission rate. For example, there is an electronic apparatus in which a large capacity transmission suck as transmission of the moving image is required in an operating mode, and only a little data transmission occurs in a stand-by mode. If the optical transmission is used even in the stand-by mode for which the use of a low modulation rate or a low transmission rate is enough, a power consumption of an optical transmitting/receiving section comprising a light emitting element, a light receiving element, and electronic devices for driving the light emitting element and the light receiving element and the like will be large, so that there is a problem in that an operating time, particularly, of a mobile device with a limited power supply capacity is shortened.

Further, when two-way communication is carried out by the optical transmission, it is necessary to prepare electrical wirings and optical wirings in the number required for two-way communication, so that there is a problem in that the number of the electrical wirings is increased.

SUMMARY OF THE INVENTION

So as to achieve the above object, the present invention is configured as follows.

According to an embodiment of the present invention, a photoelectric composite wiring component comprises:
an optical wiring for transmitting an optical signal;
an electrical wiring for transmitting an electrical signal;
a light emitting element provided at one end of the optical wiring;
a light receiving element provided at another end of the optical wiring;
a light emitting element drive circuit for driving the light emitting element; and
an amplifier for amplifying a light receiving current of the light receiving element,
wherein the photoelectric composite wiring component further comprises a transmission path switching mechanism for switching a transmission path of a transmission signal to transmit the transmission signal over an electrical transmission system that transmits the transmission signal as the electrical signal when the transmission signal is low-rate, and to transmit the transmission signal over an optical transmission system via the optical wiring when the transmission signal is high-rate.

In the above embodiment, following variations and modifications as well as combinations thereof (hereinafter referred to as "variation or the like") may be made.
(i) The transmission path switching mechanism comprises a transmission gate element for electrically or mechanically switching an electrical transmission path to a conductive state or non-conductive state, and a control element for switching the light emitting element, the light emitting element drive circuit or the amplifier to an active state, a non-active state or a quasi non-active state.
(ii) The photoelectric composite wiring component further comprises a transmission rate monitor section which determines as to whether a modulation rate or a transmission rate of a signal to be transmitted is low-rate or high-rate, and outputs a control signal in accordance with the modulation rate of the transmission signal, and the transmission path of the transmission signal is switched in response to the control signal.
(iii) The light emitting element, the light receiving element, the light emitting element drive circuit, and the amplifier composing the optical transmission system is at a non-active state or a quasi non-active state, when the transmission signal is transmitted over the electrical transmission system as the electrical signal.

(iv) In the photoelectric composite wiring component in which the transmission signal is transmitted over the electrical transmission system which transmits the transmission signal as the electrical signal when the transmission signal is low-rate, and the transmission signal is transmitted over the optical transmission system via an optical transmitting/receiving section when the transmission signal is high-rate, and both of the electrical transmission system and the optical transmission system have a one-way transmission structure.

(v) In the photoelectric composite wiring component, in which the transmission signal is transmitted over the electrical transmission system which transmits the transmission signal as the electrical signal when the transmission signal is low-rate, and the transmission signal is transmitted over the optical transmission system via the optical transmitting/receiving section when the transmission signal is high-rate, the electrical transmission system has a two-way transmission structure by a half-duplex communication and the optical transmission system has a one-way transmission structure.

(vi) An input impedance of the light emitting element drive circuit and the amplifier has an impedance to the extent that is considered to be electrically isolated at a non-active state, and is substantially matched with an impedance of a signal line to be input at an active state.

(vii) At least the electrical wiring and the optical wiring are mounted or provided on a flexible substrate.

According to another embodiment of the present invention, an electronic apparatus mounting a plurality of electronic devices comprises:

the photoelectric composite wiring component according to the above embodiment and the variation or the like as a transmission component for carry out a signal transmission between one of the electronic devices and another of the electronic devices.

Advantages of the Invention

According to the present invention, it is possible to compatibly provide both characteristics of the lower power consumption property of the transmission over the electrical wiring and the large transmission capacity of the optical transmission over the optical wiring, by automatically selecting and switching the transmission path to the transmission path to the electrical wiring system or the optical transmission path in accordance with the modulation rate or the transmission rate of the transmission signal. As an example, in a 1.8V power supply operation system, since a power consumption for the optical transmission is assumed to be around 20 mW and the power consumption for the electrical transmission is assumed to be around 5 mW, an effect of reducing the electric power by around 15 mW can be expected, by switching from the optical transmission to the electrical transmission at the time of the low-rate transmission.

EXPLANATION OF REFERENCE NUMERALS

100 Power supply line
101 Transmission rate monitor section
102 Optical transmission-electrical transmission switching signal
103 Transmission signal line
105 Transmission gate element
106 Light emitting element drive circuit
107 Light emitting element
108 Optical transmitter power supply control element
109 Optical transmission path
110 Electrical transmission path
111 Light receiving element
112 Amplifier
113 Optical power monitor circuit
114 Amplifier power supply control element
115 Transmission gate element
116 Transmission signal line
118 Master side
119 Slave side
120 Photoelectric composite wiring part
121 Reception signal line
201 Reception signal line
300 Substrate
309 Optical transmission path
330 Core
331 Clad
332, 334 End surface
333 Air layer
400 Input and output signal
401 Input and output signal
402 Control input
403 Logic inversion element
404 N-channel MOS element
405 P-channel MOS element
500 Signal line
501 Ground
502 Signal line
503 Terminating resistor
504 Terminating resistor
505 P-channel MOS element
506 N-channel MOS element
507 N-channel MOS element
508 Resistor
509 Signal line
510 Capacitor
600 Signal line
601 Ground
602 Terminating resistor
603 P-channel MOS element
604 N-channel MOS element
605 Resistor
606 N-channel MOS element
607 Resistor
608 Capacitor 609 Output signal line
700 Buffer amplifier
701 Input signal line
702 Low-pass filter
703 Peak hold circuit
704 Reference voltage source
705 Comparator
706 Output signal line

BEST MODE FOR CARRYING OUT THE INVENTION

Figure 1:
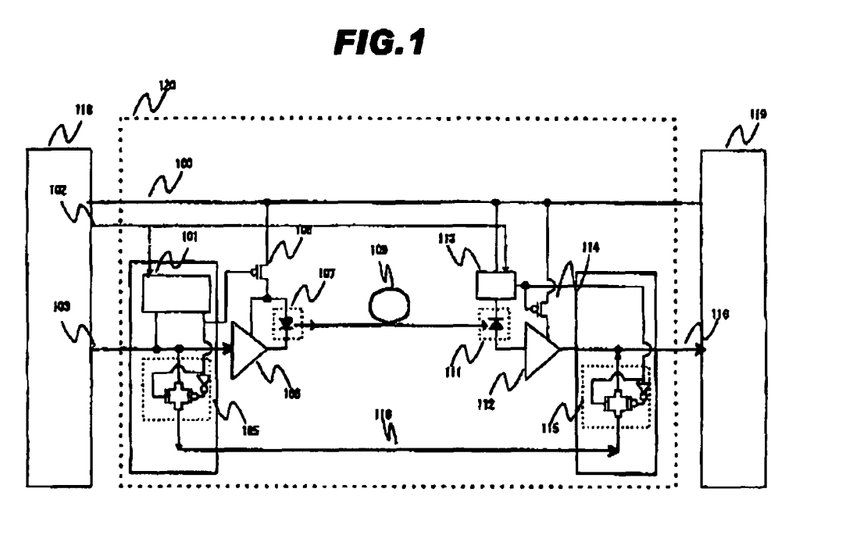
FIG. 1 is a schematic diagram showing a photoelectric composite wiring component in a first embodiment according to the present invention.

The first embodiment according to the present invention is explained below with referring to FIGS. 1, and 3 to 7. FIG. 1 is a block diagram of a photoelectric composite wiring component of the present invention. A one-way data transmission structure is configured in which a transmission direction of signals is from a master side 118 (a main body side (a keyboard side) when using a flip type portable telephone as an example) to a slave side 119 (a display side when using the flip type portable telephone as the example).

At first, a transmission path will be explained.

A light emitting element drive circuit 106 is a drive circuit which controls a light emission from a light emitting element 107 in accordance with a signal level of a transmission signal line 103, thereby converting an electrical signal to an optical signal. Further, a light receiving element 111 is optically coupled to another end of an optical transmission path 109, and converts the optical signal transmitted over the optical transmission path 109 into an electrical signal. The electrical signal that is photo-electrically converted by the light receiving element 111 is amplified by an amplifier 112, and transmitted to the slave side 119 over a transmission signal line 116. This light emitting element drive circuit 106, the light emitting element 107, the optical transmission path 109, the light receiving element 111 and the amplifier 112 are configured to convert the electrical signal to the optical signal and transmit the optical signal, thereafter convert the optical signal to the electrical signal again and transmit the optical signal, thereby composing an optical transmission system. Since it is possible to transmit the high-rate and large capacity signal at several hundreds Mbit/sec or more over this optical transmission system, this optical transmission system is suitable for the large capacity signal such as moving images.

On the other hand, a transmission system comprising a transmission gate element 105, an electrical transmission path 110, and a transmission gate element 115 is an electrical transmission system which transmits the signal as the electrical signal. Since the electrical transmission system is inferior in the transmission rate and the capacity to the optical transmission system, the electrical transmission system is used for transmitting low-rate signals such as audio signals.

Herein, a transmission rate for determining a switching between the use of the optical transmission system and the use of the electrical transmission system is appropriately set in accordance with a limit of the electrical transmission that depends upon an overall length of the transmission path and the like.

Next, function and operation of each structure of the photoelectric composite wiring component of the present invention will be explained.

A power supply line 100 is a power supply to an electronic apparatus, and supplied from the master side to the slave side.

A transmission rate monitor section 101 has a structure to monitor a transmission rate of the signals transmitted over the transmission signal line 103.

Figure 7:
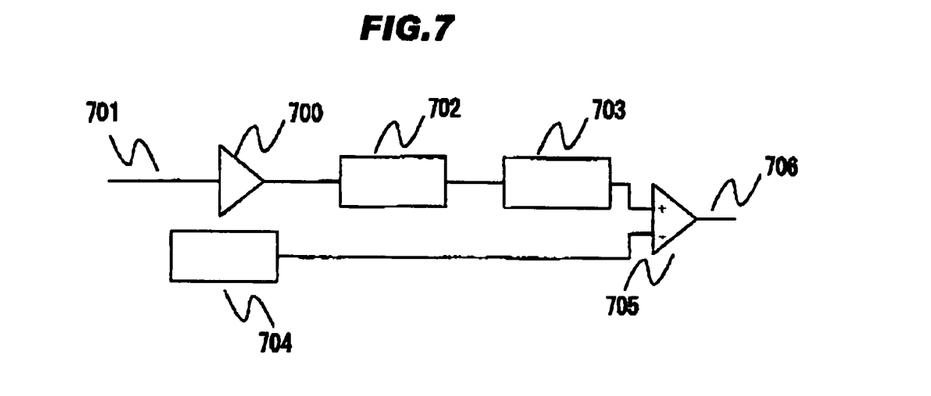
FIG. 7 is a block-diagram of a transmission rate monitor section 101 shown in FIG. 1.

FIG. 7 shows an example of an internal structure of the transmission rate monitor section 101 shown in FIG. 7. This structure is configured with assuming the case that a high-rate transmission signal (e.g. 1 Gbit/sec) is encoded with a DC balanced code, for example, a binary NRZ (Non-Return to Zero) signal using 8B10B code.

Further, when the transmission rate of the transmission signal is 1 Gbit/sec and the binary NRZ signal using the 8B10B code is used, a modulation rate is 1.25 Gbaud/sec. Further, in the case of using quaternary NRZ signal, the modulation rate is 625 Mbaud/sec.

Next, each element of the transmission rate monitor section 101 will be explained.

A buffer amplifier 700 has such a high input impedance (e.g. several MΩ or more) that an influence of a circuit (e.g. a low-pass filter 702, a peak hold circuit 703) provided at a later stage of the buffer amplifier 700 on the input signal line 701 (corresponding to the transmission signal line 103) can be ignored. An input signal is limit-amplified by a predetermined amplitude to be output.

The low-pass filter 702 is a filter which passes only the signals with a low transmission rate. A bandpass characteristic thereof is determined within such range that the low-rate transmission signal (e.g. 100 Mbit/sec or less) passes and the high-rate transmission signal (e.g. greater than 100 Mbit/sec) does not pass.

The low-pass filter 702 may be omitted by providing the buffer amplifier 700 with similar frequency characteristics.

The peak hold circuit 703 is a circuit that holds a peak voltage value of the low-rate signal passed through the low-pass filter 702, and a holding duration thereof is set to be not less than a maximum value of an interval time period of code changing in the low-rate signal.

A reference voltage source 704 is set to output a voltage set between a maximum value and an intermediate value of an output of the buffer amplifier 700.

A comparator 705 is a circuit that compares an output of the peak hold circuit 703 with an output of the reference voltage source 704, and the comparator 705 outputs a high potential (e.g. a level substantially corresponding to a source voltage) when the peak voltage value is higher than the reference voltage and outputs a low potential (e.g. a level substantially corresponding to a ground level) when the peak voltage value is lower than the reference voltage.

An output signal line 706 is connected to an output of the comparator 705, and the output signal line 706 outputs a high potential when the transmission rate of the signal input into the signal line 701 is the low-rate, and outputs a low potential when the transmission rate of the signal input to the signal line 701 is the high-rate.

Next, a control signal output by the transmission rate monitor section 101 in accordance with the modulation rate or the transmission rate of the transmission signal will be explained.

When a low-rate signal is input into the transmission rate monitor section 101 from the input signal line 701, the input signal is amplified to the predetermined amplitude by the buffer amplifier 700, and is input to the low-pass filter 702. The low-rate signal passes therethrough without change to be input to the peak hold circuit 703, and a maximum value of the output amplitude voltage of the buffer amplifier 700 is held. Since this voltage is higher than the output voltage of the reference voltage source 704, the output of the comparator 705 is the high potential, so that a control signal at the high potential showing that the transmission signal of the input signal line 701 is the low-rate is output via an output signal line 706.

Next, when a high-rate signal is input into the transmission rate monitor section 101 from the input signal line 701, the input signal is amplified to the predetermined amplitude by the buffer amplifier 700, and is input to the low-pass filter 702. Since the high-rate signal cannot pass through this low-pass filter 702, the output voltage of the low-pass filter 702 is an average voltage of the output signals of the buffer amplifier 700. Since the signal input into the buffer amplifier 700 is encoded to take the DC balance (e.g. 8B10B code), the average voltage is the intermediate value of the output amplitude of the buffer amplifier 700. Since this average voltage is input into the peak hold circuit 703, the intermediate value of the amplitude voltage is held. Since this voltage is lower than the output voltage of the reference voltage source 704, the output of the comparator 705 is the low potential, so that a control signal at the low potential showing that the transmission signal of the input signal line 701 is the high-rate is output via the output signal line 706.

On the other hand, an optical transmission-electrical transmission switching signal 102 is a signal used for switching between the optical transmission path and the electrical transmission path from the master side 118, without depending on the modulation rate or transmission rate of the transmission signal, and connected to the transmission rate monitor section 101 and the optical power monitor circuit 113. When it is not necessary to intentionally select the transmission path in the master side 118, the optical transmission-electrical transmission switching signal 102 may be omitted.

An optical transmitter power supply control element 108 is a control element which comprises a bipolar transistor, a FET transistor or the like, controls a power supply to the light emitting element 107 such as a laser diode and to the light emitting element drive circuit 106, and switches the light emitting element 107 and the light emitting element drive circuit 106 to an active state or a non-active state.

An operation mechanism will be explained below.

When the output of the comparator 705 of the transmission rate monitor section 101 is the low potential (the high-rate transmission signal), a gate is at a Low level in the optical transmitter power supply control element 108 (a P-channel MOS element in this embodiment), so that an electrical conduction between a source and a drain is established. According to this, the electric power is supplied to the light emitting element 107, so that the light emitting element 107 becomes the active state.

On the other hand, when the output of the comparator 705 of the transmission rate monitor section 101 is the high potential (the low-rate transmission signal), the gate is at a High level in the optical transmitter power supply control element 108 (a P-channel MOS element in this embodiment), so that the electrical conduction between the source and the drain is shut off. According to this operation, the electric power is not supplied to the light emitting element 107, so that the light emitting element 107 becomes the non-active state.

The optical power monitor circuit 113 provides a power supply to the light receiving element 111 such as the photo diode, monitors a light receiving current flown through the light receiving element 111, and outputs a signal for switching the amplifier power supply control element 114 and the transmission gate element 115 between the active state and the non-active state in response to a presence of the light receiving current or the optical transmission-electrical transmission switching signal 102.

An internal structure of the optical power monitor circuit 113 is such configured that a resistor is provided, for example, and a variation in the potential caused by the light receiving current flown into the resistor is detected. The optical power monitor circuit 113 outputs the low potential when the light receiving current is generated by the light receiving element 111, and the optical power monitor circuit 113 outputs a high potential when the light receiving current is not generated.

The amplifier power supply control element 114 is a control element which comprises a bipolar transistor, a FET transistor or the like, controls a power supply to the amplifier 112 in response to an output of the optical power monitor circuit 113, and switches the amplifier 112 to an active state or a non-active state.

An operation mechanism will be explained below.

When the output of the optical power monitor circuit 113 is the low potential (the high-rate transmission signal), a gate is at a Low level in the amplifier power supply control element 114 (a P-channel MOS element in this embodiment), so that an electrical conduction between a source and a drain is established. According to this operation, the electric power is supplied to the amplifier 112, so that the amplifier 112 becomes the active state.

On the other hand, when the output of the optical power monitor section 113 is the high potential (the low-rate transmission signal), the gate is at a High level in the amplifier power supply control element 114 (a P-channel MOS element in this embodiment), so that the electrical conduction between the source and the drain is shut off. According to this operation, the electric power is not supplied to the amplifier 114, so that the amplifier 114 becomes the non-active state.

The light emitting element 107 is an element that is optically coupled to one end of the optical transmission path 109 and is driven by the light emitting element drive circuit 106 to emit a light, then converts the electrical signal to an optical signal.

The optical transmission path 109 has a structure that a core layer for transmitting the optical signal is provided and a periphery of the core layer is covered with a clad layer having a refractive index lower than that of the core layer, and is manufactured by using a flexible material. The core layer is a multimode core having a diameter of about 50 to 200 μm. Of course, a multimode optical fiber or a single-mode optical fiber may be used as the optical wiring.

The transmission gate element 105 is an element which establishes the electrical conduction or the electrical isolation between the transmission signal line 103 and the electrical transmission path 110, in response to a control signal from the transmission rate monitor section 101.

Figure 4:
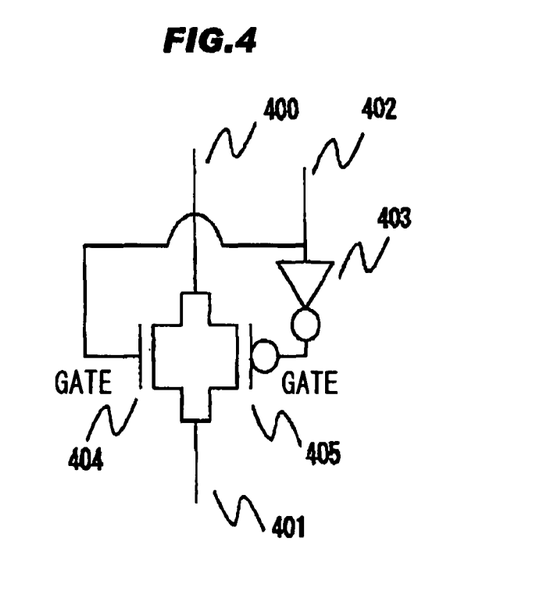
FIG. 4 is a block-diagram of a transmission gate element 105 shown in FIG. 1.

FIG. 4 shows an example of a structure of the transmission gate element 105. The transmission gate element 105 comprises input and output signal lines 400, 401, a control input 402, a logic inversion element 403 for inverting an input thereof, an N-channel MOS element 404, and a P-channel MOS element 405.

An operation of the transmission gate element 105 is as follows.

When the control input 402 (corresponding to the output signal line 706 of the transmission rate monitor section 101) is a high potential, a gate terminal of the N-channel MOS element 404 is a high potential, and a gate terminal of the P-channel MOS element 405 is a low potential because of the logic inversion element 40. According to this operation, both of the N-channel MOS element 404 and the P-channel MOS element 405 are turned to ON-state, so that an electrical conduction is established between the input and output signal lines 400 and 401.

On the other hand, when the control input 402 is a low potential, the gate terminal of the N-channel MOS element 404 is a low potential, and the gate terminal of the P-channel MOS element 405 is a high potential because of the logic inversion element 40. According to this operation, both of the N-channel MOS element 404 and the P-channel MOS element 405 are turned to OFF-state, so that an electrical conduction is shut off between the input and output signal lines 400 and 401.

Herein, the transmission gate element 105 is configured by combining the N-channel MOS element 404 and the P-channel MOS element 405, for the purpose of operating the transmission gate element 105 in both of the case that a potential level of the transmission signal is low level and the case that the potential level of the transmission signal is high level, by configuring that the P-channel MOS element 405 operates when a DC level of the transmission signal is low level and the N-channel MOS element 404 operates when the DC level of the transmission signal is high level.

Further, the transmission signal line 103 is terminated at the light emitting element drive circuit 106 with an input impedance which coincides with a characteristic impedance of the transmission signal line 103 to the extent that a return of the electrical signal can be ignored, when the power supply of the light emitting element drive circuit 106 is turned on.

In addition, the light emitting element drive circuit 106 is designed to have an extremely high input impedance to the extent that is considered to be electrically isolated (several MΩ or more) when the electric power is not supplied.

Figure 5:
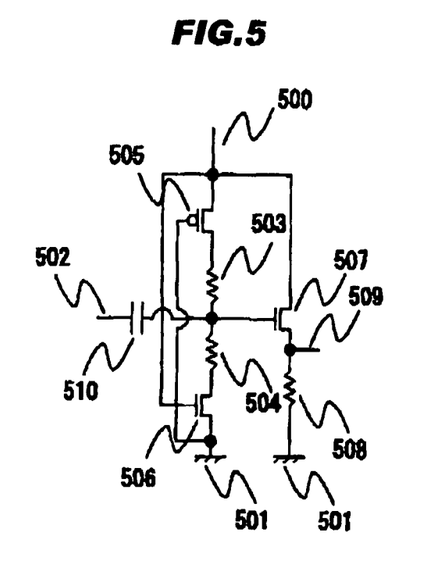
FIG. 5 is a circuitry diagram of an input part of a light emitting element drive circuit 106 shown in FIG. 1.

FIG. 5 shows an example of an internal structure of an input part of the light emitting element drive circuit 106. It is assumed that the high-rate transmission signal is encoded with the DC balanced code such as the 8B10B code.

A signal line 500 is connected to a power supply (not shown).

A signal line 502 is an input line of a transmission signal to the light emitting element drive circuit 106.

Resistors 503 and 504 are resistor elements for termination, and a resistance value is selected to provide a desired input impedance.

A P-channel MOS element 505 and an N-channel MOS element 506 are elements for controlling electrical connection between the terminating resistors 503, 504, the power supply, and a ground 501.

A resistor 508 and an N-channel MOS element 507 are elements for buffer-amplifying an input signal.

A signal line 509 is an output line for the buffer-amplified signal.

A capacitor 510 is a capacitor for realizing an alternate current coupling between the signal line 502, the terminating resistors 503, 504, and the N-channel MOS element 507.

A signal line 509 is an output signal line for the later stage of the light emitting element drive circuit.

A gate-source voltage for providing the ON state in each MOS element is set to be sufficiently greater than an amplitude of a signal transmitted over the signal line 502.

When the power supply is applied, a gate terminal of the P-channel MOS element 505 is low potential, and a source terminal thereof is high potential, so that the P-channel MOS element 505 is turned to the ON state. In addition, a gate terminal of the N-channel MOS element 506 is high potential, and a source terminal thereof is low potential, so that the N-channel MOS element 506 is turned to the ON state, so that the terminal resistor 503 is electrically conducted to the power supply and the terminal resistor 504 is electrically conducted to the ground 501, so that the signal line 502 is terminated.

When the power supply is not applied to the signal line 500, the gate terminal of the P-channel MOS element 505 has a same potential as that of the ground, and the source terminal thereof has a potential determined by the amplitude of the signal line 402 with respect to the ground as a center. In the P-channel MOS element 505, the gate-source voltage for providing the ON state is greater than the amplitude of the signal line 502, so that the P-channel MOS element 505 is turned to the OFF state.

Similarly, the gate terminal of the N-channel MOS element 506 has the potential same as the ground, and the gate terminal thereof has a potential determined by the amplitude of the signal line 502 with respect to the ground as the center, so that the terminal resistor 503 and the power supply are electrically isolated from the ground 501, and the transmission signal line 502 is not terminated at the resistors 503, 504. In addition, the gate terminal of an N-channel MOS element 507 has a high input impedance. Therefore, when the power supply is not turned on, the light emitting element drive circuit 106 has the high input impedance.

The amplifier 112 is such designed that the amplifier 112 is terminated at an output end to have an output impedance which coincides with a characteristic impedance of the transmission signal line 116 to the extent that a return of the electrical signal can be ignored when the power supply is provided thereto, and to have an extremely high output impedance to the extent that is considered to be electrically isolated (several MΩ or more) when the power supply is not provided.

Figure 6:
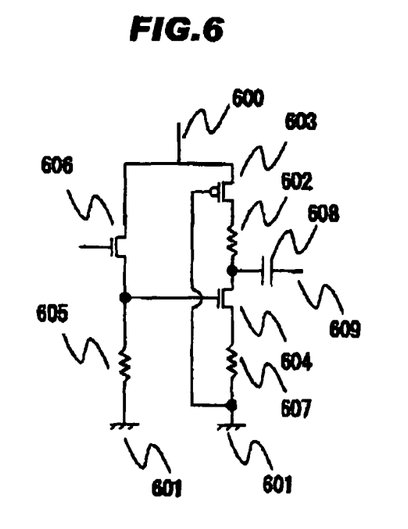
FIG. 6 is a circuitry diagram of an output part of an amplifier 112 shown in FIG. 1.

FIG. 6 shows an example of an internal structure of an output part of the amplifier. It is assumed that the high-rate transmission signal is encoded with the DC balanced code such as the 8B10B code.

A signal line 600 is connected to a power supply (not shown).

A resistor 602 is a resistor element for termination, and a resistance value is selected to provide a desired output impedance.

A P-channel MOS element 603 is an element for controlling electrical connection between the terminating resistor and the power supply.

A resistor 605 and an N-channel MOS element 606 are elements for buffer-amplification. An output thereof is input to an N-channel MOS 604.

The input signal is amplified by a voltage gain determined by a ratio between the resistors 602 and 607, and output to an output signal line 609.

A capacitor 608 realizes an alternate current coupling between the output signal line 609 and an output circuit part.

A gate-source voltage for providing the ON state in each MOS element is selected to be sufficiently greater than amplitude of a signal transmitted over the output signal line 609.

When the power supply is applied to the signal line 600, a gate terminal of the P-channel MOS element 603 is low potential, and a source terminal thereof is high potential, so that the P-channel MOS element 603 is turned to the ON state, so that the terminal resistor 503 is electrically conducted to the power supply, and the signal line 502 is terminated.

On the other hand, when the power supply is not applied, the gate terminal of the P-channel MOS element 603 has a same potential as that of the ground 601, and the source terminal thereof has a potential determined by the amplitude of the signal applied to the output signal line 609 from outside with respect to the ground as a center. In the P-channel MOS element 603, the gate-source voltage for providing the ON state is greater than the amplitude of the signal applied to the signal line 502 from the outside, so that the P-channel MOS element 603 is turned to the OFF state. Therefore, the terminal resistor 602 and the power supply are electrically isolated from each other, so that the output signal line 609 is not terminated at the terminal resistor 602. In addition, the gate terminal of the N-channel MOS element 604 has the ground potential, so that the N-channel MOS element 604 is turned to the OFF state. Therefore, when the power supply is not turned on, the output of the amplifier 112 is the high impedance.

The transmission gate element 115 is an element for electrically conducting or isolating between the transmission signal line 116 and the electrical transmission path 110 in response to a control signal from the optical power monitor circuit 113. In addition, a structure and a mechanism of an electrical shutoff thereof are similar to those of the transmission gate element 105.

The transmission signal line 116 is a signal line for data transmitted from the master side 118 to the slave side 119, and the signal is output from the photoelectric composite wiring part 120 to the slave side 119. The output signal is a signal from the amplifier 112 or a signal from the electrical transmission path 110 connected thereto via the transmission gate element 115.

On the other hand, it is possible to provide the electrical shutoff or the electrical conduction by mechanically intercepting or connecting the transmission path, with using MEMS (Micro Electro Mechanism System) in which a mechanical component, an actuator, an electronic circuit or the like are integrated, in place of the transmission gate elements 105, 115, or the control elements 108, 114 that are electronic devices.

The electrical insulation characteristic can be enhanced by mechanically intercepting the transmission path by using the MEMS. In addition, it is possible to provide a superior high frequency property, since the affect of other circuits can be shut off.

Next, an example of a mounting structure of the optical transmission system of the photoelectric composite wiring component according to the present invention will be explained below.

Figure 3:
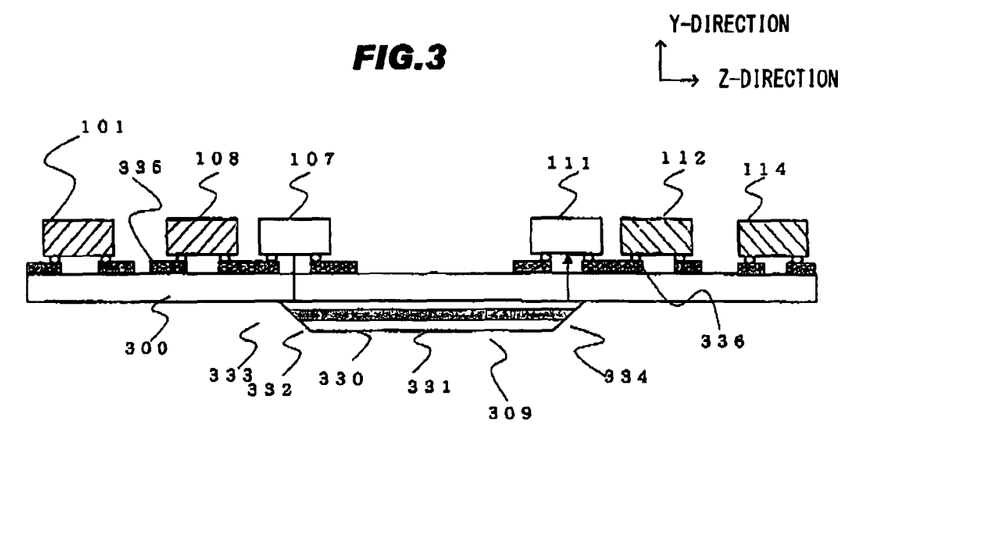
FIG. 3 is a cross sectional view of the photoelectric composite wiring component shown in FIG. 1.

FIG. 3 is a cross sectional view of the mounting form of the photoelectric composite wiring component of the present invention.

An optical transmission path 309 is formed at a back surface side of a flexible substrate 300. The substrate 300 is optically transparent with respect to a transmission signal wavelength, and can transmit the optical signal therethrough with low loss. The optical transmission path comprises a core 330 for propagating a signal light and a clad 331 for covering the clad 330. As a material of the core 330 and the clad 331, it is preferable to use a polymer material that is superior in flexibility and optical transparency with respect to the transmission wavelength, such as polyimide, epoxy, silicone, and acrylic polymer. As the material of the substrate 300, it is preferable to use a polymer material that is superior in the flexibility and the optical transparency with respect to the transmission wavelength, such as polyimide, epoxy, silicone, and acrylic polymer.

At a front surface side of the substrate 300, the transmission rate monitor section 101, the light emitting element 107 composing a transmitting part, a light emitting element drive circuit (not shown), the optical transmitter power supply control element 108, the light receiving element 111 composing a receiving part, the amplifier 112, and the amplifier power supply control element 114 are mounted.

The light emitting element 107 is a surface emitting laser (VCSEL: Vertical Cavity Surface Emitting Laser), and flip-chip bonded with a solder 336 on an electrode 335 of the substrate 300, and an optical signal emitted from the light emitting element 107 is transmitted through the substrate 300, thereafter incident on the core 330 provided beneath the substrate 300. It is easy to provide an optical coupling with the light emitting element 107, since the core 330 has the diameter of around 50 to 200 μm.

On the other hand, an end surface 332 of the core 330 is slant-processed with an angle of substantially 45 degrees with respect to a light traveling direction, and a slant-processed surface is in contact with a layer 333 (herein, an air layer) having a refractive index different from that of the core 330, so that the optical signal is reflected at a slant surface 332 with the angle of 45 degrees and propagates along the inside of the core 330, and another end surface 334 of the core 330 is also slant-processed with an angle of substantially 45 degrees, so that the optical signal is again reflected at the slant surface 334 with the angle of substantially 45 degrees, thereby changing the propagating direction of the optical signal to a Y-direction shown in FIG. 3. The optical signal transmitted through the substrate 300 is incident on the light receiving element 111 provided at an upper surface of the substrate 300, to be converted to an electrical signal, thereafter, the amplification of the electrical signal is performed by an amplifier (not shown).

Further, as to the light emitting element 107 and the light receiving element 111, it is preferable to protect the optical element and a bonding part by potting (not shown) with the use of a resin such as silicone for the purpose of improving the reliability.

Still further, metal such as gold, aluminum may be formed on the end surface 332 by evaporation in order to increase the reflectivity.

Next, a switching operation of the transmission path, in the case that the signal transmission by the electrical transmission is not possible because of the high transmission rate and the optical transmission is required, will be explained.

At first, the transmission rate monitor section 101 connected to the transmission signal line 103 detects that the transmission rate is high-rate.

The transmission rate monitor section 101 controls the optical transmitter power supply control element 108 (to the active state in this embodiment) in order to supply the electric power to the light emitting element drive circuit 106 and the light emitting element 107, thereby emitting the light from the light emitting element 107. Simultaneously, the transmission gate element 105 is controlled to be electrically isolated, since the control signal from the transmission rate monitor section 101 (an output from the comparator 705) is low potential. According to this operation, the electrical conduction between the transmission signal line 103 and the electrical transmission path 110 is shut off. Therefore, the high-rate electrical signal transmitted over the transmission signal line 103 is electrically shut off from the electrical transmission system, so that the high-rate electrical signal is not affected by a load capacity or a reflected signal attributable to the electrical transmission path 110. In other words, even though the transmission rate of the transmission signal is high-rate, the quality of the transmission signal transmitted between the master side 118 and the light emitting element drive circuit 106 will not be deteriorated.

By the light emission from the light emitting element 107, the signal light is incident on the light receiving element 111 connected via the optical transmission path 109, and the light receiving current is flown over the light receiving element 111. The optical power monitor circuit 113 detects that the optical signal is incident on the light receiving element 111 based on this light receiving current, and operates the amplifier power supply control element 114 to supply the electric power to the amplifier 112. Simultaneously, the transmission gate element 105 is controlled to be electrically isolated by the transmission rate monitor section 101, the electrical conduction between the electrical transmission path 110 and the transmission signal line 116 is shut off. Therefore, the high-rate electrical signal is not affected by the load capacity or the reflected signal attributable to the electrical transmission path 110, so that the quality of the data transmission between the amplifier 112 and the slave side 119 will not be deteriorated, even though the transmission rate of the transmission signal is high-rate. As described above, in the case that the transmission rate is high-rate, the data signal from the master side 118 is transmitted to the slave side 119 over the optical transmission system comprising the transmission signal line 103, the light emitting element drive circuit 106, the light emitting element 107, the optical transmission path 109, the light receiving element 111, and the amplifier 112, and over the transmission signal line 116, thereby forming a transmission line with high quality and large capacity.

Next, a switching operation of the transmission path, in the case that the low-rate transmission signal which can be transmitted over the electrical transmission system is transmitted, will be explained.

At first, the transmission signal line 103 is a signal line for the transmission signal transmitted from the master side 118 to the slave side 119, and the transmission signal is input to the photoelectric composite wiring part 120. The input transmission signal is transmitted to the light emitting element drive circuit 106 of the optical transmission system and the transmission gate element 105 of the electrical transmission system.

The transmission rate monitor section 101 connected to the transmission signal line 103 detects that the transmission rate is low-rate. The transmission rate monitor section 101 controls the power supply control element 108 (to the non-active state in this embodiment) to intercept the power supply to the light emitting element drive circuit 106 and the light emitting element 107, thereby stopping the light emission from the light emitting element 107.

Simultaneously, the transmission gate element 105 is controlled to be electrically conducted, since the control signal from the transmission rate monitor section 101 (the output of the comparator 705) is high potential. According to this operation, the electrical conduction between the transmission signal line 103 and the electrical transmission path 110 is established.

On the other hand, by stopping the light emission from the light emitting element 107, the signal light is not incident on the light receiving element 111 optically connected thereto via the optical transmission path 109, and the light receiving current is not generated in the light receiving element 111. When the optical power monitor circuit 113 detects that the light receiving current is not generated in the light receiving element 111, the optical power monitor circuit 113 controls the amplifier power supply control element 114 (to the non-active state in this embodiment) to intercept the power supply to the amplifier 112. Simultaneously, the optical power monitor circuit 113 controls the transmission gate element 105 (to the active state in this embodiment) to be electrically conducted. Therefore, the electrical transmission path 110 and the transmission signal line 116 are electrically connected to each other.

As described above, the electrical transmission line in which the data signal from the master side 118 is transmitted to the slave side 119 over the electrical transmission system comprising the transmission signal line 103, the transmission gate element 105, the electrical transmission path 110 and the transmission gate element 115, and the transmission signal line 116 is established.

As described above, when the transmission rate is low-rate, the power supply to the light emitting element drive circuit 106 or the amplifier 112 with the large power consumption is intercepted, so that almost only the electrical transmission system is in the active state. As described above, since the transmission system is switched to the electrical transmission system or the optical transmission system in accordance with the transmission rate of the data signal, and particularly, in the case that the transmission rate is low-rate, the power consumption of the optical transmission system can be reduced an ignorable level by intercepting the optical transmission system, so that it is possible to carry out the data transmission with the power consumption at the same level as the case using the conventional wiring component only for the electrical transmission, thereby realizing a long time operation of the electronic apparatus.

Herein, a small amount of the power supply (e.g. to the extent that the element remains at the boundary between the active state and the non-active state) may be provided without completely intercepting the optical transmission system. By providing the small amount of the power supply, the operation time of the light emitting element, the light receiving element or the electronic device can be made faster, thereby realizing the high speed starting. For example, in the light emitting element such as a semiconductor laser, it is possible to shorten a time from an extinction state to a light emission state, or to reduce turbulence in the optical signal waveform, by supplying a slight amount of the electric current that is less than and around a threshold current.

Further, since it is possible to carry out the signal transmission with large capacity in the optical wiring, it is possible to transmit a signal amount equal to or more than that of the conventional wiring component comprising only the electrical wiring, even though the number of the wirings is reduced. Therefore, it is advantageous for downsizing since it is possible to compose the wiring component with the number of signal wirings that is less than that in the conventional electrical wiring.

Figure 2:
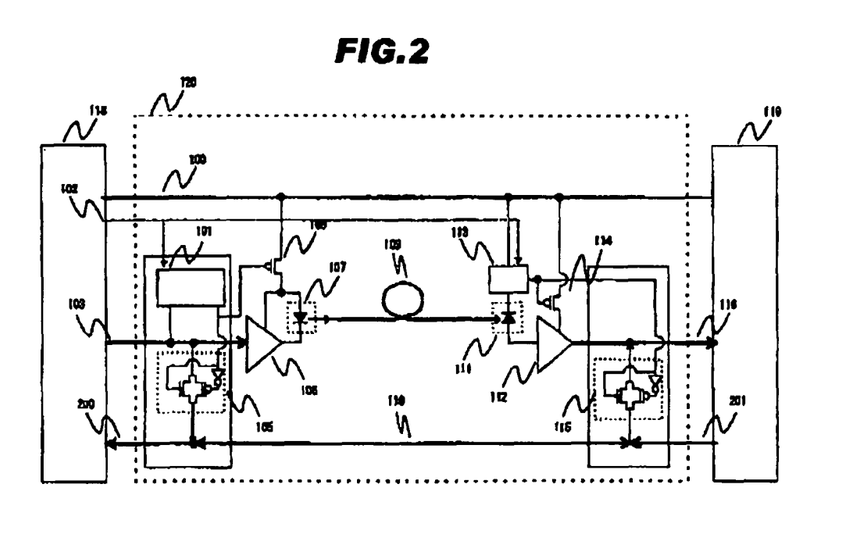
FIG. 2 is a schematic diagram showing a photoelectric composite wiring component in a second embodiment according to the present invention.

Next, FIG. 2 shows a second embodiment of the invention. Herein, same reference numerals are assigned to same structure and parts as those in FIG. 1. Further, since the structure and operation for switching the use of the optical transmission system and the use of the electrical transmission system are same as those in the aforementioned first embodiment, the explanation thereof is omitted. Herein, an operation of the two-way transmission will be explained below.

FIG. 2 shows an example of a structure of the two-way data transmission between the master side 118 and the slave side 119. There is a case that the high transmission rate is required for the transmission in a direction from the master side 118 to the slave side 119. On the other hand, a relatively low transmission rate is sufficient for the transmission in a direction from the slave side 119 to the master side 118, and the low transmission rate is sufficient for the transmission in both directions at the stand-by mode or the like. The above structural example is suitable for the latter case, and the two-way transmission is carried out in a half-duplex communication over a single electrical transmission path.

A transmission signal line 116 is a signal line for data transmitted from the master side 118 to the slave side 119, and the data is output from the photoelectric composite wiring part 120 to the slave side 119.

A reception signal line 201 is a signal line for data transmitted from the slave side 119 to the master side 118, and the data is input to the photoelectric composite wiring part 120.

For the low-rate electrical signal that is transmitted from the slave side 119 to the master side 118, a transmission line by the electrical transmission from the reception signal line 201 to a reception signal line 200 via an electrical transmission path 110 is formed. Since it is possible to form an impedance matching line without any stub by providing the transmission gate elements 105, 115, it is available for a relatively high transmission rate.

According to the above structure, all of the transmission signal line 103 and the reception signal line 200 at the master side 118 as well as the transmission signal line 116 and the reception signal line 201 at the slave side 119 are connected via the electrical transmission path 110, so that it is possible to form an electrical transmission channel between the master side 118 and the slave side 119, in which the two-way transmission can be carried out by the half-duplex communication.

This embodiment may be used, for example, in a mobile telephone provided with a crystal liquid display on a back side thereof in a state that a flip is closed (stand-by mode), for a communication of a transmission data to be displayed at a back-side liquid crystal display from the master side to the slave side, and for a communication of a confirmation signal for confirming a safe receipt of a transmitted content from the slave side to the master side after the termination of the data transmission.

Further, when the transmission rate is low-rate, the power supply to the light emitting element drive circuit 106 and the amplifier 112 with the large power consumption are substantially shut off, and the signal transmission is substantially carried out only over the electrical transmission line, so that the signal transmission can be carried out with the power consumption at the same level as that in the case of using the conventional wiring component only for the electrical transmission.

The photoelectric composite wiring component of the present invention can be applied to electronic devices such as mobile telephone, personal computer, mobile terminal and the like. In particular, when the electrical wiring and the optical wiring are integrally formed by using the flexible material such as polymer material, it is easy to bend and superior in the flexibility. Therefore, it is possible to electrically connect an electronic device mounted on a main body side of the portable telephone, mobile terminal and the like with another electronic device mounted on a display part thereof, by using the photoelectric composite wiring component of the present invention.

The present invention is not limited to the above embodiments. The master side 118 and the slave side 119 may be provided in the same casing. It is also possible to transmit the transmission signal from one electronic device to another electronic device in the same casing.

Further, the optical transmission path 309 may be provided within the substrate 300 rather than at a surface of the substrate 300.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

INDUSTRIAL APPLICABILITY

The photoelectric composite wiring component of the present invention may be applied to the electronic device such as mobile telephone, personal computer, and mobile terminal. According to the photoelectric composite wiring component of the present invention, it is possible to compatibly provide both characteristics of the lower power consumption property of the transmission over the electrical wiring and the large transmission capacity of the optical transmission over the optical wiring, by automatically selecting and switching the transmission path to the electrical wiring system or the optical wiring system in accordance with the modulation rate or the transmission rate of the transmission signal.

What is claimed is:

1. A photoelectric composite wiring component comprising:
    an optical wiring for transmitting an optical signal;
    an electrical wiring for transmitting an electrical signal;
    a light emitting element provided at one end of the optical wiring;
    a light receiving element provided at another end of the optical wiring;
    a light emitting element drive circuit for driving the light emitting element;
    an amplifier for amplifying a light receiving current of the light receiving element;
    a transmission path switching mechanism for switching a transmission path of a transmission signal to transmit the transmission signal over an electrical transmission system that transmits the transmission signal as the electrical signal when the transmission signal is low-rate, and to transmit the transmission signal over an optical transmission system via the optical wiring when the transmission signal is high-rate;
    an optical power monitor circuit for monitoring a light receiving current flown through the light receiving element; and
    wherein the transmission path switching mechanism comprises:
        a transmission gate element for electrically or mechanically switching an electrical transmission path of the electrical transmission system to a conductive state or non-conductive state; and
        an amplifier control element for switching the amplifier to an active state or a non-active state based on a monitoring result of the optical power monitor circuit.

2. The photoelectric composite wiring component according to claim 1, wherein the transmission signal is transmitted over the electrical transmission system that transmits the transmission signal as the electrical signal when the transmission signal is low-rate, and the transmission signal is transmitted over the optical system via an optical transmitting/receiving section when the transmission signal is high-rate, and
    wherein both of the electrical transmission and the optical transmission system have a one-way transmission structure from a master side to a slave side.

3. The photoelectric composite wiring component according to claim 1, wherein the transmission signal is transmitted over the electrical transmission system that transmits the transmission signal as the electrical signal when the transmission signal is low-rate, and the transmission signal is transmitted over the optical system via an optical transmitting/receiving section when the transmission signal is high-rate, and
    wherein the electrical transmission system has a two-way transmission structure by a half-duplex communication between a master side and a slave side and the optical transmission system has a one-way transmission structure from the master side to the slave side.

4. The photoelectric composite wiring component according to claim 1, wherein an input impedance of the light emitting element has an impedance to the extent that is considered to be electrically isolated at a non-active state, and is substantially matched with an impedance of a signal line to be input at an active state.

5. The photoelectric composite wiring component according to claim 1, wherein at least the electrical wiring and the optical wiring are mounted or provided on a flexible substrate.

6. An electronic apparatus mounting a plurality of electronic devices comprising:
the photoelectric composite wiring component according to claim 1, as a transmission component for carrying out a signal transmission between one of the electronic devices and another of the electronic devices.

7. The photoelectric composite wiring according to claim 1, wherein an output impedance of the amplifier has an impedance to the extent that is considered to be electrically isolated at a non-active state, and is substantially matched with an impedance of a signal line to be input at an active state.

8. The photoelectric composite wiring component according to claim 1, wherein the transmission path switching mechanism further comprises:
an optical transmitter control element for switching the light emitting element or the light emitting element drive circuit to an active state, a non-active state or a quasi non-active state.

9. The photoelectric composite wiring component according to claim 8, further comprising:
a transmission rate monitor section which determines as to whether a modulation rate or a transmission rate of a signal to be transmitted is low-rate or high-rate, and outputs a control signal in accordance with the modulation rate of the transmission signal,
wherein the transmission path of the transmission signal is switched in response to the control signal.

10. The photoelectric composite wiring component according to claim 8, wherein at least one of the light emitting element, the light receiving element, the light emitting element drive circuit, and the amplifier composing the optical transmission system is at a non-active state or a quasi non-active state, when the transmission signal is transmitted over the electrical transmission system as the electrical signal.

11. The photoelectric composite wiring component according to claim 8, wherein the transmission signal is transmitted over the electrical transmission system that transmits the transmission signal as the electrical signal when the transmission signal is low-rate, and the transmission signal is transmitted over the optical system via an optical transmitting/receiving section when the transmission signal is high-rate, and
wherein both of the electrical transmission system and the optical transmission system have a one-way transmission structure from a master side to a slave side.

12. The photoelectric composite wiring component according to claim 8, wherein the transmission signal is transmitted over the electrical transmission system that transmits the transmission signal as the electrical signal when the transmission signal is low-rate, and the transmission signal is transmitted over the optical system via an optical transmitting/receiving section when the transmission signal is high-rate, and
wherein the electrical transmission system has a two-way transmission structure by a half-duplex communication between a master side and a slave side and the optical transmission system has a one-way transmission structure from the master side to the slave side.

13. The photoelectric composite wiring component according to claim 8, wherein an input impedance of the light emitting element has an impedance to the extent that is considered to be electrically isolated at a non-active state, and is substantially matched with an impedance of a signal line to be input at an active state.

* * * * *